US 9,927,034 B2

(12) United States Patent
Abouelleil et al.

(10) Patent No.: US 9,927,034 B2
(45) Date of Patent: Mar. 27, 2018

(54) VALVE SEAT STIFFENER (71) Applicant: Mueller International, LLC, Atlanta, GA (US)

(72) Inventors: Ashraf Abouelleil, Oswego, IL (US); Purushottam Savalia, Aurora, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 14/834,596

(22) Filed: Aug. 25, 2015

(65) Prior Publication Data
US 2017/0059052 A1    Mar. 2, 2017

(51) Int. Cl.
*F16K 1/226* (2006.01)
*F16K 25/00* (2006.01)
*F16K 27/02* (2006.01)
*F16K 1/228* (2006.01)

(52) U.S. Cl.
CPC .......... *F16K 1/2263* (2013.01); *F16K 1/2266* (2013.01); *F16K 25/005* (2013.01); *F16K 27/0218* (2013.01); *F16K 1/2285* (2013.01)

(58) Field of Classification Search
CPC ........ F16K 25/005; F16K 1/22; F16K 1/2263; F16K 1/2265; F16K 1/2266; F16K 1/228; F16K 1/2285; F16K 1/226; F16F 1/02; F16F 1/025
USPC ....... 251/172, 173, 175, 305, 306, 307, 359, 251/360, 361, 362, 363, 364, 365, 177
See application file for complete search history.

(56) References Cited

U.S. PATENT DOCUMENTS

| 2,988,320 | A | * | 6/1961 | Preben | F16K 1/222 251/174 |
| 3,319,661 | A | * | 5/1967 | Shindler | F16K 3/312 138/94.3 |
| 3,475,007 | A | * | 10/1969 | Fawkes | F16K 1/2263 251/305 |
| 3,642,248 | A | * | 2/1972 | Benware | F16K 1/2266 251/172 |
| 3,650,508 | A | * | 3/1972 | Kosmala | F16K 1/2263 251/173 |
| 3,726,504 | A | * | 4/1973 | Kormos | F16K 1/226 251/306 |
| 3,734,457 | A | * | 5/1973 | Roos | F16K 1/2285 251/173 |
| 3,858,698 | A | * | 1/1975 | Hause | F16D 25/0638 188/216 |

(Continued)

OTHER PUBLICATIONS

"Material Selection Guide Spring Materials (Round Wire)" by Spring-I-Pedia (http://springipedia.com/material-spring-materials.asp, publicly available in the internet since Feb. 3, 2011 according to Wayback Machine [https://archive.org/web/]).*

(Continued)

*Primary Examiner* — Kevin Murphy
*Assistant Examiner* — David Colon Morales
(74) *Attorney, Agent, or Firm* — Taylor English Duma LLP (57) ABSTRACT

A valve seat device including a valve seat and a seat stiffener, the seat stiffener formed from a non-elastomeric material and positioned on a radially outward-facing surface of the valve seat, an outer diameter of the radially outward-facing surface of the valve seat being greater than an inner diameter of the seat stiffener.

23 Claims, 5 Drawing Sheets

(56) References Cited

U.S. PATENT DOCUMENTS

| | | | | |
|---|---|---|---|---|
| 3,997,142 A * | 12/1976 | Broadway | ............ | F16K 1/2263 251/307 |
| 4,005,848 A * | 2/1977 | Eggleston | ............ | F16K 1/2266 251/173 |
| 4,015,818 A * | 4/1977 | Tawakol | ............... | F16K 1/2263 251/173 |
| 4,071,041 A | 1/1978 | Moran, Jr. et al. | | |
| 4,113,268 A | 9/1978 | Simmons et al. | | |
| 4,114,856 A * | 9/1978 | MacAfee | ............. | F16K 1/2285 251/173 |
| 4,120,482 A * | 10/1978 | Cox | ..................... | F16K 1/2263 251/173 |
| 4,130,285 A * | 12/1978 | Whitaker | ............. | F16K 5/0673 137/67 |
| 4,145,057 A * | 3/1979 | Wheeler | ............. | F16J 15/3212 277/553 |
| 4,165,859 A * | 8/1979 | Maciulaitis | ............. | F16K 25/00 251/173 |
| 4,176,820 A * | 12/1979 | Broadway | ............. | F16K 1/2263 251/173 |
| 4,195,815 A * | 4/1980 | Stager | ................... | F16K 1/2266 251/173 |
| 4,201,239 A * | 5/1980 | Kawamura | ............ | F16J 15/008 137/72 |
| 4,210,313 A * | 7/1980 | Chester | ................ | F16K 1/2263 251/173 |
| 4,220,172 A * | 9/1980 | Stager | ................... | F16K 1/2263 137/74 |
| 4,247,079 A * | 1/1981 | Friess | ................... | F16K 1/2266 251/174 |
| 4,258,901 A * | 3/1981 | Zinnai | ................... | F16K 5/0668 251/173 |
| 4,289,296 A | 9/1981 | Krause | | |
| 4,331,319 A * | 5/1982 | Summers | ............... | F16K 1/2285 251/173 |
| 4,378,104 A * | 3/1983 | Ben-Ur | ................. | F16K 1/2285 251/173 |
| 4,394,003 A * | 7/1983 | Whitaker | ............. | F16K 1/2266 251/173 |
| 4,487,216 A | 12/1984 | Barker et al. | | |
| 4,508,315 A * | 4/1985 | Livorsi | ................ | F16K 1/2266 251/173 |
| 4,575,048 A * | 3/1986 | Bregman | ............. | F16K 1/2263 137/15.25 |
| 4,638,976 A * | 1/1987 | Souplet | ................ | F16K 1/2285 251/173 |
| 4,645,180 A * | 2/1987 | Bregman | ................. | F16K 1/22 137/315.23 |
| 4,655,462 A * | 4/1987 | Balsells | ............... | F16J 15/3212 267/1.5 |
| 4,676,481 A * | 6/1987 | Hayes | .................... | F16K 1/222 251/173 |
| 4,685,611 A | 8/1987 | Scobie et al. | | |
| 4,688,597 A * | 8/1987 | Clarkson | ............... | F16K 3/0227 137/375 |
| 4,964,204 A * | 10/1990 | Balsells | .................. | F16F 1/045 29/896.9 |
| 4,980,117 A * | 12/1990 | Blaushild | ............... | F16J 15/061 376/205 |
| 5,117,066 A * | 5/1992 | Balsells | .................... | F16F 1/04 174/370 |
| 5,370,149 A * | 12/1994 | Clarkson | ............... | F16K 3/0281 137/375 |
| 5,388,806 A | 2/1995 | Kusmer et al. | | |
| 5,427,354 A | 6/1995 | Kusmer et al. | | |
| 5,560,587 A * | 10/1996 | McCutcheon | ........ | F16K 3/0281 251/327 |
| 5,685,520 A * | 11/1997 | Velan | .................... | F16K 1/2266 251/305 |
| 5,890,700 A * | 4/1999 | Clarkson | ............... | F16K 3/0281 251/327 |
| 6,224,064 B1 * | 5/2001 | St. Germain | ......... | F16K 1/2263 251/306 |
| 6,254,071 B1 * | 7/2001 | Greenhill | ................ | F16F 1/328 267/158 |
| 7,055,825 B2 * | 6/2006 | Watanabe | .............. | F16J 15/006 277/349 |
| 7,416,164 B2 * | 8/2008 | Eggleston | ............... | F16K 1/222 251/174 |
| 8,714,521 B2 * | 5/2014 | Nelson | .......................... | 251/173 |
| 2002/0130289 A1 | 9/2002 | Knobbe et al. | | |
| 2005/0001195 A1 * | 1/2005 | Blease | .................. | F16J 15/104 251/171 |
| 2007/0251579 A1 | 11/2007 | Weide | | |

OTHER PUBLICATIONS

Apollo Valves; Brochure for Butterfly Valves, revised Aug. 29, 2014, 16 pgs.

Engineers Edge, LLC; "Bellevile Springs" located at <http://www.engineersedge.com/spring_general.htm>, accessed on Jun. 10, 2015, 2 pgs.

Pentair; Brochure for Keystone K-LOK High Performance Butterfly Valves, located at <www.pentair.com/valves>, publicly available prior to Aug. 25, 2015, 12 pgs.

Pratt Industrial; Brochure for HP Series High Performance Double Offset Butterfly Valve, publicly available prior to Aug. 25, 2015, 12 pgs.

Pratt Industrial; Brochure for Installation, Operation and Maintenance Manual for the HP Series, publicly available prior to Aug. 25, 2015, 10 pgs.

Abouelleil, Ashraf; International Search Report and Written Opinion for PCT Application No. PCT/US2016/048141, filed Aug. 23, 2016, dated Nov. 1, 2016, 8 pgs.

* cited by examiner

VALVE SEAT STIFFENER

TECHNICAL FIELD

This disclosure relates to valves used in fluid systems. More specifically, this disclosure relates to valve seats.

BACKGROUND

Valves, such as a butterfly valve, are typically installed in a fluid system, such as a water system. For example, a valve can be useful in temporarily preventing flow from one portion of a fluid system to another portion of the fluid system. A valve that does not seal effectively or that does not continue to seal effectively after repeated opening and closing, however, can result in costly repairs, unnecessarily frequent maintenance, and sometimes additional costs resulting from the valve's failure to completely stop the flow of fluid through the fluid system.

SUMMARY

Disclosed is a valve seat device including a valve seat and a seat stiffener, the seat stiffener formed from a non-elastomeric material and positioned on a radially outward-facing surface of the valve seat, an outer diameter of the radially outward-facing surface of the valve seat being greater than an inner diameter of the seat stiffener.

Also disclosed is a valve including a valve body and a valve seat device, the valve seat device including a valve seat and a seat stiffener, the seat stiffener formed from a non-elastomeric material and positioned on a radially outward-facing surface of the valve seat, an outer diameter of the radially outward-facing surface of the valve seat being greater than an inner diameter of the seat stiffener.

Also disclosed is a method of sealing a valve including closing the valve and preventing radial expansion of the valve seat with a seat stiffener, the seat stiffener formed from a non-elastomeric material and positioned on a radially outward-facing surface of the valve seat, an outer diameter of the radially outward-facing surface of the valve seat being greater than an inner diameter of the seat stiffener.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is a valve and associated methods, systems, devices, and various apparatus. The valve includes a valve seat device including a valve seat and a seat stiffener. It would be understood by one of skill in the art that the disclosed valve is described in but a few exemplary embodiments among many. No particular terminology or description should be considered limiting on the disclosure or the scope of any claims issuing therefrom.

Figure 1:
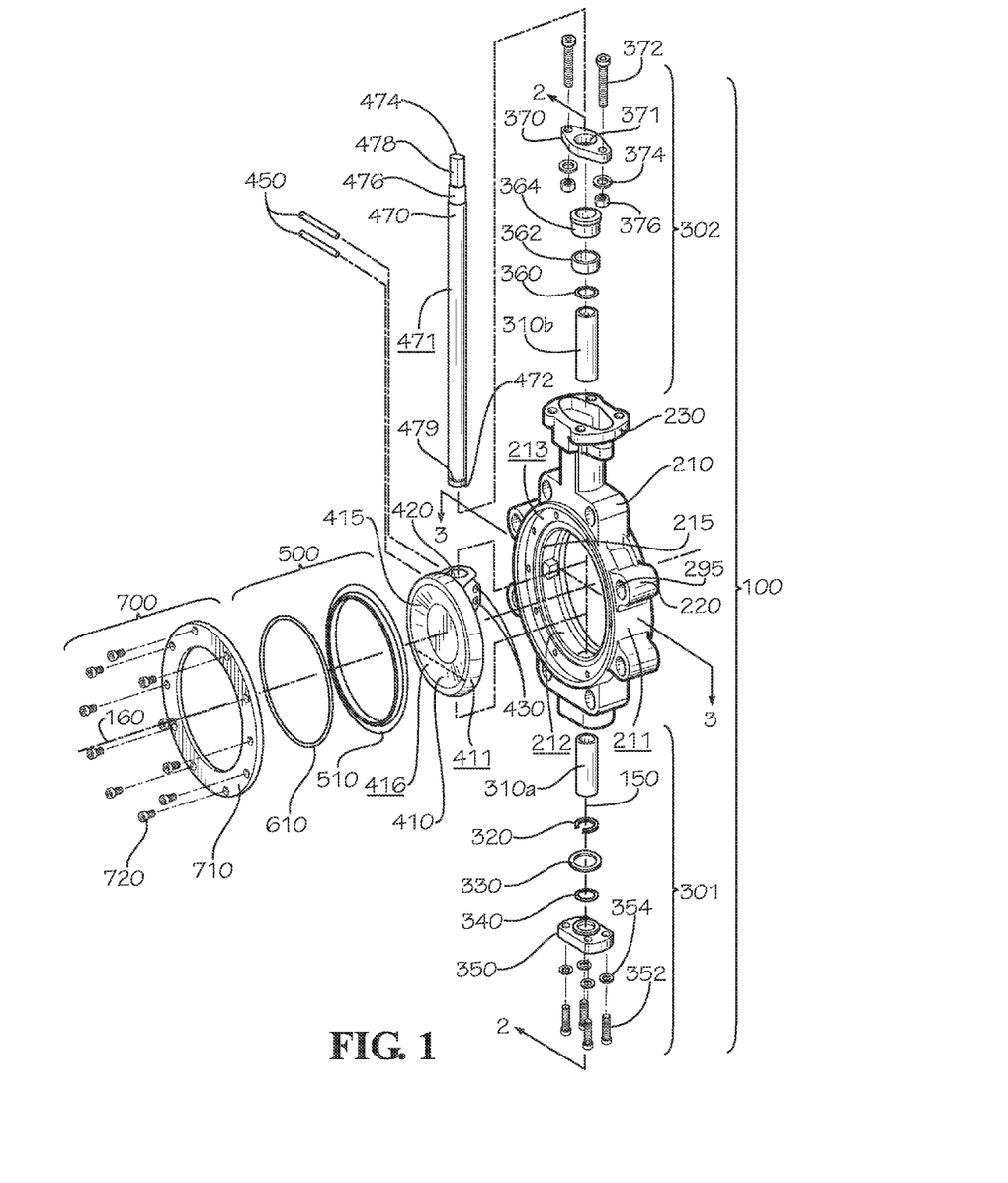
FIG. 1 is a perspective exploded view of a butterfly valve including a valve seat device in accordance with one embodiment of the current disclosure.

FIG. 1 discloses one embodiment of a valve 100. In the present embodiment, the valve 100 is a butterfly valve; however, in various other embodiments, the valve 100 could be one of various other types of valves including, but not limited to a ball valve, a plug valve, a cone valve, or a valve in a hydrant. The valve 100 includes a valve body 210, a lower bearing 301, and an upper bearing 302 assembled along a vertical axis 150. The valve 100 further includes a valve disc 410, a valve shaft 470, a valve seat device 500, and a seat retainer device 700 assembled along a horizontal axis 160 and secured to the valve body 210. In various embodiments, the valve seat device 500 includes a valve seat 510 and a seat stiffener 610. In various embodiments, the seat retainer device 700 includes a retention ring 710 and a plurality of fasteners 720 by which the retention ring 710 is secured to the valve body 210. In various embodiments, the valve seat 510, the seat stiffener 610, and the retention ring 710 each define an annular ring shape that is coaxial about the horizontal axis 160.

In various embodiments, the valve disc 410 of a butterfly valve such as the valve 100 rotates about an axis such as the vertical axis 150 that is defined across a diameter of the valve 100. As in a typical butterfly valve, the valve disc 410 of the valve 100 rotates a quarter of a turn between the fully open and fully closed positions. In a typical butterfly valve, a radial cross-section of a valve disc such as the valve disc 410 remains in the path of the fluid traveling through the valve 100 even when the valve 100 is open. The disclosure of a typical butterfly valve or typical rotation angle or particular valve configuration, however, should not be considered limiting on the current disclosure.

The valve body 210 is of a "lugged" type and includes multiple lugs 220 for securing the valve 100 to a piping system (not shown). In a "lugged" type valve, a plurality of fasteners that secure the valve 100 to the piping system assemble into a plurality of holes 295 defined in the lugs 220. The valve body 210 may also be constructed as a "flanged" type, a "wafer" type, or a "butt-weld" type valve, although the type of construction should not be considered limiting on the current disclosure. A "flanged" type valve includes an attachment flange on each axial end of a valve for attaching the valve to the piping system using holes defined in each attachment flange, and a "wafer" type valve includes neither lugs nor attachment flanges but is sandwiched between opposing flanges on the adjacent piping components of the piping system in which it is installed. A "butt-weld" type valve does not require fasteners for assembly to the piping system but is instead welded in place.

The valve body 210 includes an outer surface 211 and an inner surface 212 and defines a bore 215 through which a fluid can pass. In various embodiments, the inner surface 212 includes a seat mating surface 213. In various embodiments, the bore 215 is circular in shape. In various embodiments, the valve body 210 also includes a bonnet 230 to which an actuator (not shown) can be assembled. In various embodiments, the valve 100 is adapted to open or close by hand with an actuator including either a lever operator (not shown) or a gear operator (not shown). In various embodiments, the valve 100 can be made to open or close by pneumatic or electrical power. The valve body 210 may be cast from any one or more of a number of different metals or metal alloys including, but not limited to, stainless steel, carbon steel, ductile iron, and various steel and non-steel alloys including the INCOLLOY alloys, the MONEL alloys, the HASTELLOY alloys, the INCONEL alloys, and the chrome moly alloys. The valve body 210 may also be machined. The disclosure of stainless steel, carbon steel, ductile iron, and the other listed alloys for the material of the valve body 210, however, should not be considered limiting on the current disclosure. In addition, the disclosure of casting and machining of the valve body 210 should also not be considered limiting on the current disclosure.

In various embodiments, the lower bearing 301 includes a lower bushing 310a, a retainer ring 320, a lower packing 330, a spacer 340, and an end cap 350 secured to the valve body 210 with a plurality of fasteners including bolts 352 and washers 354. In various embodiments, each of the components of the lower bearing 301 is aligned along the vertical axis 150 with each other and with the valve shaft 470 when assembled with the valve body 210. In various embodiments, the retainer ring 320 is a C-shaped annular ring and defines features such as holes or notches by which it can be removed with a removal tool.

In various embodiments, the upper bearing 302 includes an upper bushing 310b, a packing retainer 360, an upper packing 362, a packing gland 364, and a gland flange 370 secured to the valve body 210 with a plurality of fasteners including bolts 372, washers 374, and nuts 376. In various embodiments, each of the components of the lower bearing 301 is aligned along the vertical axis 150 with each other and with the valve shaft 470 when assembled with the valve body 210.

In various embodiments, the lower bushing 310a and the upper bushing 310b are made from 316-series stainless steel and are impregnated with either polytetrafluoroethylene (PTFE) or graphite to reduce friction. The disclosure of stainless steel, PTFE, and graphite for the materials of the bushings 310a,b, however, should not be considered limiting on the current disclosure.

The valve disc 410 defines a sealing surface 411, a shaft bore 420 aligned with the vertical axis 150 and with an axial center of the valve shaft 470 in an assembled valve 100, and one or more pin bores 430. The shaft bore 420 is sized to receive the valve shaft 470, and the pin bores 430 are each sized to receive a shaft pin 450. In various embodiments, both the pin bores 430 and the shaft pins 450 are tapered. In various embodiments, a first side 415 of the valve disc 410 axially opposite from the shaft bore 420 defines a concave surface 416. In various embodiments, the presence of the concave surface 416 reduces the material required to fabricate the valve disc 410 or reduces the pressure drop across the valve 100 during use in a fluid system. The disclosure of a particular shape for the valve disc 410, however, should not be considered limiting on the current disclosure.

The valve shaft 470 includes a lower end 472 and an upper end 474 and defines one or more pin bores 480 (shown in FIG. 2) therebetween that are themselves tapered and that axially align with the pin bores 430 during assembly. The valve shaft 470 includes a shaft surface 471, the shaft surface 471 defining a groove 479 at the lower end 472. In various embodiments, the groove 479 is sized to receive the retainer ring 320. The valve shaft 470 may step down in diameter at an upper end 474. In various embodiments, a diameter of a recessed portion 476 of the upper end 474 fits inside a bore 371 in the gland flange 370. In various embodiments, a diameter of an attachment portion 478 fits inside a bore 371 in the gland flange 370 and is also sized to receive an actuator. In various embodiments, the actuator can operate or rotate the valve shaft 470 without rotating with respect to the valve shaft 470 because the attachment portion 478 includes a double-D shaped portion. The double-D shaped portion can also be described as a circular shape in cross-section that has been truncated on two opposing sides to create a flat section on each side, wherein the two flat sections are parallel to one another. In various embodiments, the attachment portion 478 matches a complementary opening in the actuator.

Figure 2:
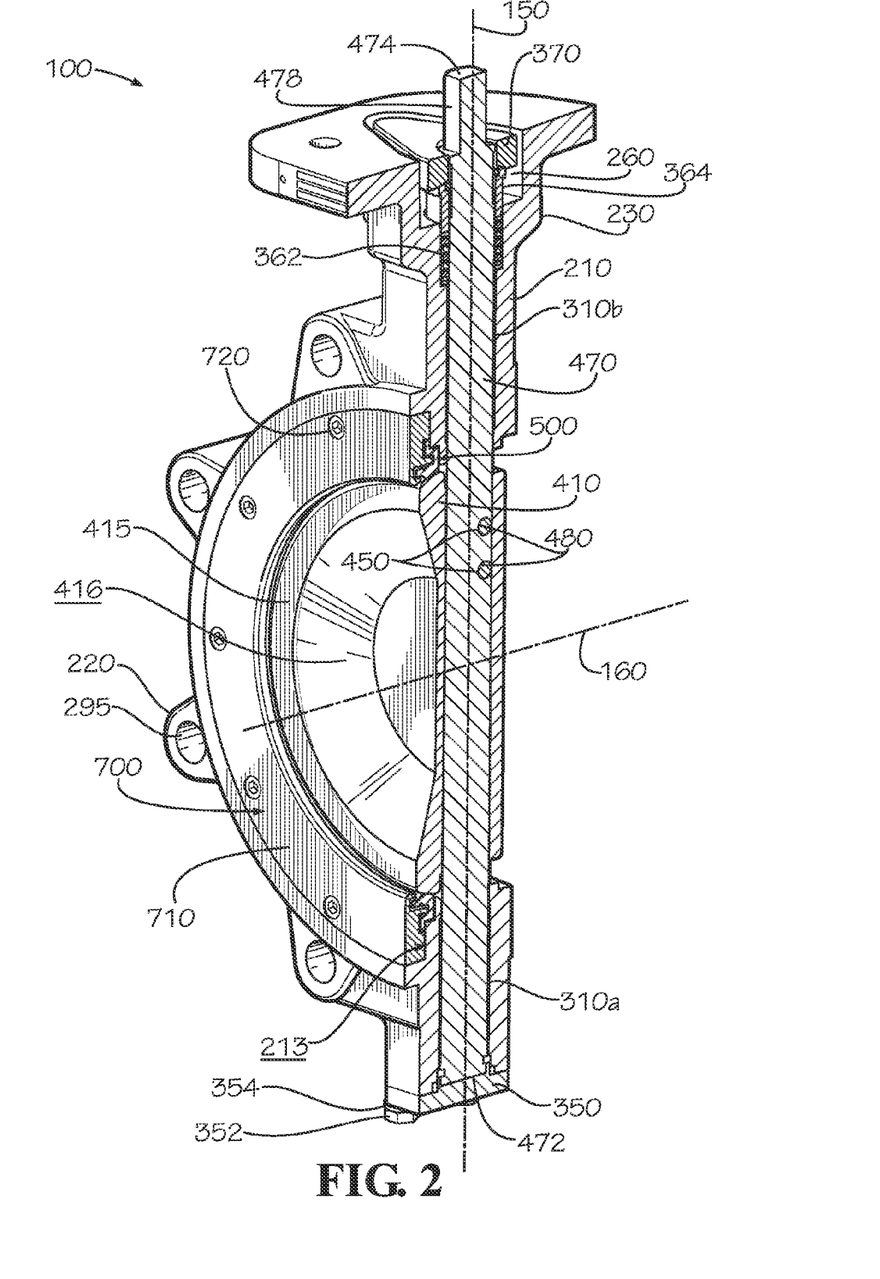
FIG. 2 is perspective sectional view of the valve of FIG. 1 taken along lines 2-2 of FIG. 1.

FIG. 2 discloses a sectional perspective view of the valve 100 as fully assembled and in a closed position before installation into a piping system. In various embodiments, the pin bores 480 are offset from an axial center of the valve shaft 470 and from the vertical axis 150 that is collinear with the axial center of the valve shaft 470. In various embodiments, the pin bores 480 are also offset from the horizontal axis 160. An outer diameter of the pin bores 480 may be positioned to line up with a tangent of an outer diameter of the valve shaft 470. The shaft pins 450 are assembled in the pin bores 480 of the valve shaft 470 and in the pin bores 430 of the valve disc 410 (shown in FIG. 1). In various embodiments, the shaft pins 450 are secured to the valve shaft 470 by spot welding or tack-welding them to the valve shaft 470. FIG. 2 also discloses the valve seat device 500 and the seat retainer device 700 assembled to the seat mating surface 213 of the valve body 210. In various embodiments, no part of the seat retainer device 700 will protrude in an axial direction past the valve body 210. In various embodiments, nothing except the end cap 350, bolts 352 and washers 354 will extend past a bottom of the valve 100; and nothing except the attachment portion 478 of the upper end 474 of the valve shaft 470 will extend past a top of the valve 100. The upper packing 362 and the packing gland 364 are shown sandwiched in between the gland flange 370 and a recessed portion 260 of the bonnet 230 of the valve body 210. The disclosure herein of particular components and mechanisms for holding and turning the valve disc 410, however, should not be considered limiting on the current disclosure. Any other mechanism, structure, or device may be used in various embodiments to turn the valve disc 410 of a butterfly valve such as the valve 100 or the corresponding structures in other types of valves.

Figure 3:
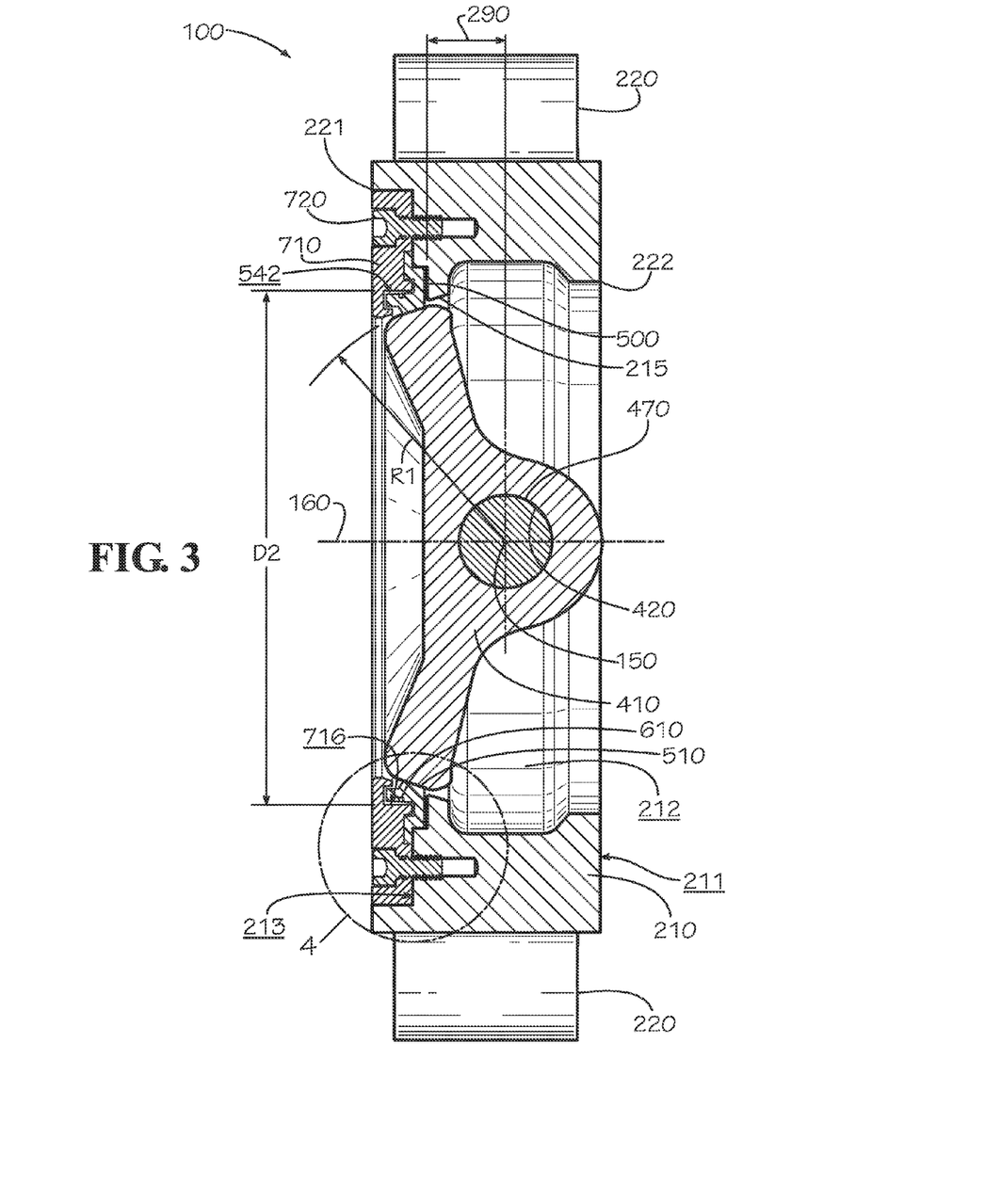
FIG. 3 is a sectional view of the valve of FIG. 1 taken along lines 3-3 of FIG. 1.

FIG. 3 discloses another sectional view of the valve 100. The valve disc 410, shown in its closed position inside the valve body 210, rotatably moves together with the valve shaft 470 about the vertical axis 150 to seal against the valve seat device 500. With the assistance of the fasteners 720 in the current embodiment, the retention ring 710 holds the valve seat device 500 in place against the seat mating surface 213 of the valve body 210. The inner surface 212 defined by the valve body 210 begins at an inlet 221 and ends at an outlet 222. The disclosure of an inlet 221 and an outlet 222, however, should not be considered limiting. In various embodiments, the valve 100 exhibits bi-directional functionality and may be used in dead-end service. A valve having bi-directional functionality such as the valve 100 can be installed in such a way that a fluid in a fluid system can flow in either direction through the valve 100. Not only can the valve 100 be installed in such a way that a fluid in a fluid system can flow through the bore 215 from the inlet 221 to the outlet 222, but the valve 100 can also be installed in such a way that that a fluid in a fluid system can flow also from the outlet 222 to the inlet 221. In dead-end service, a valve such as the valve 100 caps and seals the end of a particular piping section or other opening in the piping system. In various embodiments, a first radially inward-facing portion 754 (shown in FIG. 4) of a second end surface 750 (shown in FIG. 4) of the retention ring 710 is adjacent to and facing the seat stiffener 610 and is adjacent to and facing a radially outward-facing surface 542 of the valve seat 510. In various embodiments, the first radially inward-facing portion 754 of the retention ring 710 defines an inner diameter D2 that is greater than an outer diameter D1 of the radially outward-facing surface 542 of the valve seat 510. In various embodiments, the inner diameter D2 is greater than the outer diameter D1 (shown in FIG. 5) of the radially outward-facing surface 542 of the valve seat 510 by an amount that creates a space between the valve seat 510 and the first radially inward-facing portion 754 of the retention ring 710. In various embodiments, the radially outward-facing surface 542 of the valve seat 510 and the first radially inward-facing portion 754 of the retention ring 710 define a channel 716 between the two surfaces, wherein the first radially inward-facing portion 754 defines a backstop for the sealing end 512 of the valve seat 510 to prevent radial movement of the valve seat 510 beyond a radially outermost surface of the channel 716 defined by the first radially inward-facing portion 754. In various embodiments, the vertical axis 150 is offset in an axial direction from an axially innermost portion of the seat mating surface 213 by an offset distance 290.

Figure 4:
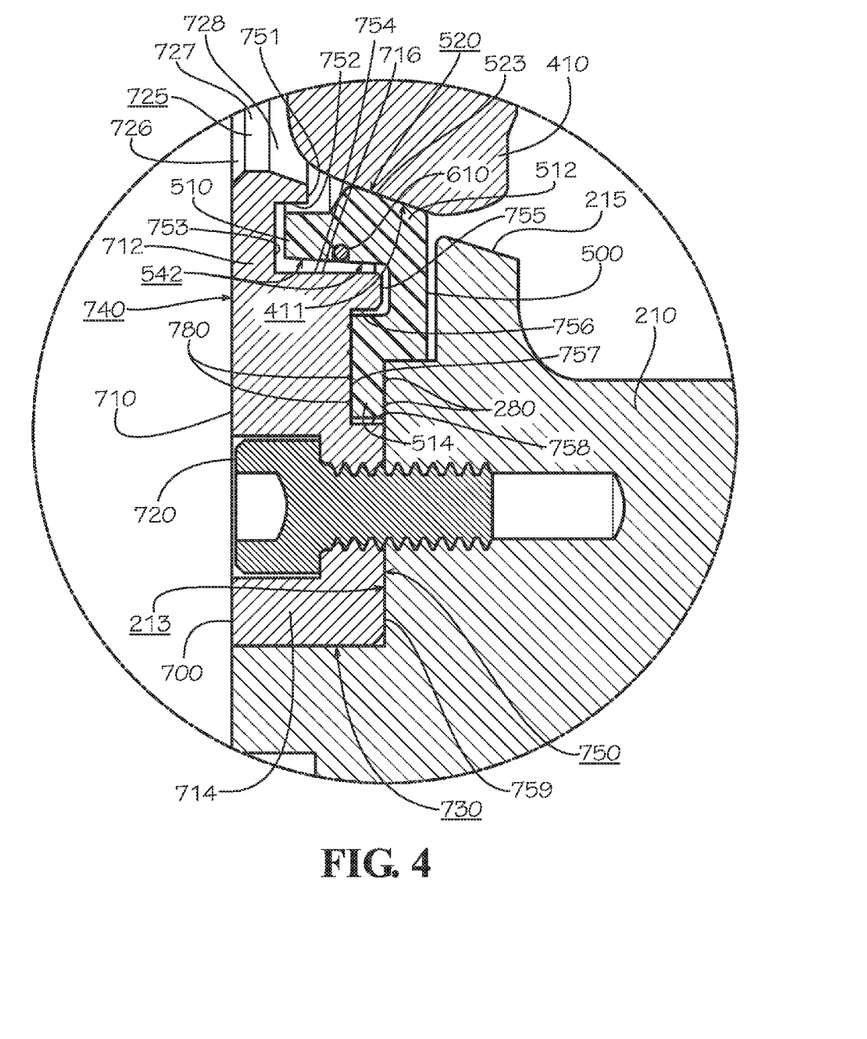
FIG. 4 is a detail view of the valve of FIG. 1 taken from detail 4 of FIG. 3.

FIG. 4 discloses a detail view of the interaction between the valve disc 410, the valve seat device 500, the seat retainer device 700, and the valve body 210. The valve disc 410 and the valve seat 510 are sized and shaped so that a complete seal is formed between the sealing surface 411 of the valve disc 410 and the sealing portion 523 of the inner surface 520 of the valve seat 510 when the valve disc 410 is closed as shown. The seal formed between the valve disc 410 and the valve seat 510 prevents fluid flow between the inlet 221 and the outlet 222 of the valve 100. In various embodiments, the valve disc 410 defines a swivel radius R1 (shown in FIG. 3) between an intersection of the vertical axis 150 and the horizontal axis 160 and the sealing surface 411 of the valve disc 410. In various embodiments, the valve 100 as fully assembled defines the same radius R1 between an intersection of the vertical axis 150 and the horizontal axis 160 and the sealing portion 523 of the inner surface 520 of the valve seat 510. In various embodiments, the valve 100 as fully assembled defines a radius R2 (shown in FIG. 5) between an intersection of the vertical axis 150 and the horizontal axis 160 and the sealing portion 523 of the inner surface 520 of the valve seat 510. In various embodiments, the radius R2 of a valve seat 510 at rest (without bearing any axial or radial load) is slightly smaller than the radius R1 to ensure a slight interference fit between the valve seat 510 and the valve disc 410. In various embodiments, the sealing portion 523 of the inner surface 520 of the valve seat 510 and the sealing surface 411 of the valve disc 410 are each flat in cross-section where they are in contact with each other when the valve 100 is in the closed position shown. In various embodiments, the radii R1 is measured to a midpoint or an axially-central edge of the sealing surface 411 of the valve disc 410 that is in contact with the sealing portion 523 of the inner surface 520 of the valve seat 510. In various embodiments, the radii R2 is measured to a midpoint or an axially-central edge of the sealing portion 523 of the inner surface 520 of the valve seat 510 that is in contact with the sealing surface 411 of the valve disc 410.

When the valve 100 opens by rotation about the vertical axis 150 of the valve disc 410 with respect to the valve body 210, the valve disc 410 is made to slide past the valve seat 510 and break the seal to allow passage of fluid through the valve 100. In various embodiments, the valve seat device 500 will provide as little resistance to the rotational movement of the valve disc 410 as possible but provide enough resistance so that an adequate seal is formed. In various embodiments, forming the valve seat 510 from polytetrafluoroethylene (PTFE) will facilitate the opening and closing of the valve disc 410. In various embodiments, the use of PTFE will facilitate the opening and closing of the valve disc 410 due to the very low coefficient of friction between PTFE and the sealing surface 411 of the valve disc 410. In various embodiments, the valve seat 510 of the valve seat device 500 will flex or compress enough to allow the sealing surface 411 of the valve disc 410 to slightly displace an inner surface 520 of the valve seat 510 and make a proper seal with the valve disc 410 due to a slight amount of radial interference between the surfaces.

In various embodiments, a valve seat such as the valve seat 510 when made from PTFE or a similar material will at least temporarily deform during the process of closing of the valve disc 410 against the valve seat 510. In various embodiments, the valve seat 510 will permanently deform over time because materials like PTFE are limited in their ability to return to their original shape after repeated flexing. In various embodiments, the presence of a seat stiffener such as the seat stiffener 610 supports the valve seat 510 by helping to maintain the original size and shape of the valve seat 510 and thus allows the valve 100 to benefit from certain helpful properties of PTFE such as its very low coefficient of friction without its operation and durability being negatively impacted by other properties of PTFE and similar materials disclosed herein.

The disclosure of PTFE for the material of the valve seat 510 should not be considered limiting on the current disclosure, however, as a valve seat in various other embodiments may be formed from any one or more of a variety of materials including, but not limited to, variations of PTFE such as reinforced PTFE (RTFE), modified PTFE (MTFE), reinforced and modified PTFE (RMTFE), ultra-high molecular weight polyethylene (UHMWPE), and rubber. The disclosure of these additional materials for a valve seat should also not be considered limiting on the current disclosure. In various embodiments, a valve seat such as the valve seat 510 formed from a softer material benefits more from the incorporation of a seat stiffener 610 because a valve seat formed from a softer material will deform more easily under high pressure than a valve seat formed from a harder material such as stainless steel.

In various embodiments, the retention ring 710 defines an inner surface 725, an outer surface 730, a first end surface 740, and the second end surface 750. In various embodiments, the retention ring 510 defines various substituent sub-elements of each surface. The retention ring 710 defines a working end 712 and a mounting end 714. In various embodiments, the inner surface 725 includes a first angled portion 726, a cylindrical portion 727, and a second angled portion 728, each of which face at least partially radially inward. In various embodiments, an intersection between adjacent portions of the inner surface 725 or any other intersecting surfaces of the valve seat 510 may form a radiused portion. In various embodiments, the outer surface 730 is cylindrical in shape. In various embodiments, the first end surface 740 defines a bore for assembling the retention ring 710 with the fasteners 720. In various embodiments, the second end surface 750 includes a first face portion 751, a first radially outward-facing portion 752, a second face portion 753, the first radially inward-facing portion 754, a third face portion 755, a second radially outward-facing portion 756, a fourth face portion 757, a second radially inward-facing portion 758, and a fifth face portion 759.

In various embodiments, the retention ring 710 defines grooves 780 in an axially inward-facing surface such as the fourth face portion 757 of the second end surface 750. In various embodiments, the grooves 780 face and interact with a mounting end 514 of the valve seat 510. In various embodiments, the fourth face portion 757 of the second end surface 750 engages the mounting end 514 of the valve seat 510 to hold the valve seat 510 against the valve body 210. In various embodiments, the ability of the retention ring 710 to engage and hold in place a valve seat such as the valve seat 510 is improved by the presence of the grooves 780, especially when the valve seat 510 is made from a material such as PTFE having a very low coefficient of friction. In various embodiments including when the mounting end 514 of the valve seat 510 is compressed slightly in an axial direction, the grooves 780 provide discontinuous or sharp edges in the fourth face portion 757 to counter the low coefficient of friction of the material forming the valve seat 510. In the current embodiment, the retention ring 710 defines four grooves 780 in the axially inward-facing surface.

In various embodiments, the seat mating surface 213 of the valve body 210 defines grooves 280 facing axially outward and facing a mounting end 514 of the valve seat 510. In the current embodiment, the seat mating surface 213 defines two annular grooves 280. In various embodiments, the ability of the valve body 210 to engage and hold in place a valve seat such as the valve seat 510 is improved by the presence of the grooves 280, especially when the valve seat 510 is made of a material such as PTFE having a very low coefficient of friction. In various embodiments including when the mounting end 514 of the valve seat 510 is compressed slightly in an axial direction, the grooves 280 provide discontinuous or sharp edges in the seat mating surface 213 to counter the low coefficient of friction of the material forming the valve seat 510.

In various embodiments, the fifth face portion 759 of the second end surface 750 engages the valve body 210 to hold the retention ring 710 in place. In various embodiments, the second radially outward-facing portion 756 and the second radially inward-facing portion 758 of the second end surface 750 restrain the mounting end 514 of the valve seat 510 but also allow for the retention ring 710 and the valve seat 510 to fit together within an acceptable tolerance range (i.e., without the need for parts to be machined, molded, or otherwise formed as precisely as might otherwise be required).

Figures 5, 6, 7:
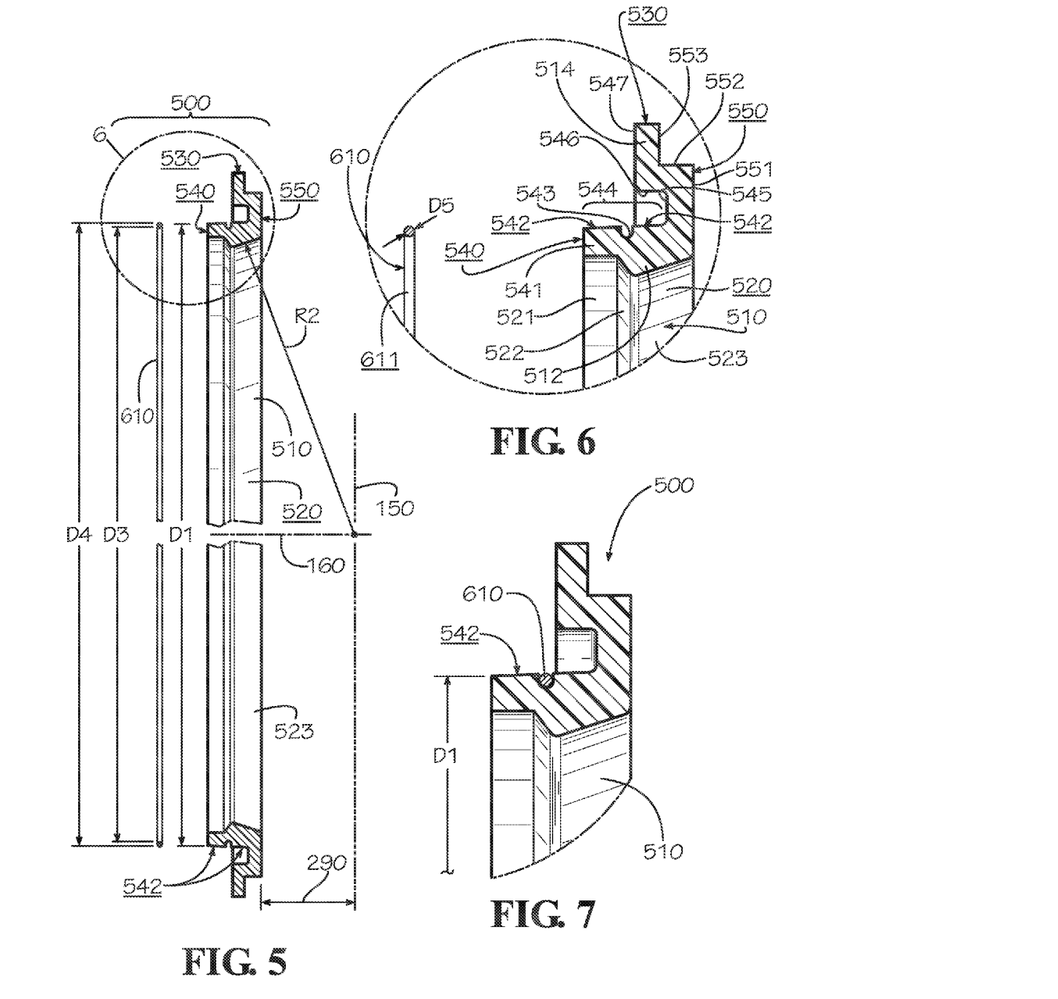
FIG. 5 is a sectional view of a valve seat device of FIG. 1 taken along an axial centerline of the valve seat device.
FIG. 6 is a detail sectional exploded view of a valve seat and a seat stiffener of the valve seat device of FIG. 1.
FIG. 7 is a detail sectional view of the assembled valve seat device of FIG. 1.

FIG. 5 discloses the unassembled valve seat device 500 including the valve seat 510 and the seat stiffener 610. In various embodiments, the valve seat 510 defines the inner surface 520, an outer surface 530, a first end surface 540, and a second end surface 550. In various embodiments, the seat stiffener 610 is welded into an annular ring from a straight length of wire and has a solid, circular cross-section with an inner diameter D3, an outer diameter D4, and an outer surface 611 (shown in FIG. 6). In various embodiments, the seat stiffener 610 is formed from a single steel wire. The disclosure of a seat stiffener that is welded into an annular ring from a straight length of wire and has a solid, circular cross-section, however, should not be considered limiting on the current disclosure. In various embodiments, a seat stiffener such as the seat stiffener 610 may be formed without welding or bending, may have a cross-section that is non-circular, or may have an overall shape that is non-circular. In various embodiments, a seat stiffener may include more than one wire. In various embodiments, however, the single wire of the seat stiffener 610 will yield multiple benefits including, but not limited to, stiffness, ease of manufacturability, minimal weight, and minimal material usage.

In various embodiments, the outer diameter D1 of the radially outward-facing surface 542 minus a groove 543 (shown in FIG. 6) is greater than or equal to the inner diameter D3 of the seat stiffener 610. In various embodiments, the outer diameter D1 of the radially outward-facing surface 542 minus the groove 543 is greater than or equal to the outer diameter D4 of the seat stiffener 610. In various embodiments, a radial depth of the groove 543 is equal to a diameter of the wire or other material used to form the seat stiffener 610.

A material such as used in the seat stiffener 610 exhibits a variety of mechanical properties including a modulus of elasticity or Young's modulus. In various embodiments, the seat stiffener 610 is made from a non-elastomeric material, where an elastomeric material is a material having a relatively low Young's modulus that is generally adapted to expand, contract, compress, or stretch under normal operating conditions to a degree that is visible by the naked eye. An elastomeric material such as rubber has a Young's modulus of 15,000 psi (approximately 0.1 GPa), which is about two orders of magnitude below the Young's modulus of one of the weaker materials used for springs such as phosphor bronze. In various embodiments, the seat stiffener 610 is formed from a material having a modulus of elasticity in tension equal to that of phosphor bronze or at least about 15,000,000 psi (approximately 103 GPa). In various embodiments, the seat stiffener 610 is formed from a material having a modulus of elasticity in tension of about 28,000,000 psi (approximately 193 GPa). In various embodiments, the seat stiffener 610 is formed from a 316 series stainless steel meeting the requirements of ASTM A313. The disclosure of a material having a modulus of elasticity in tension of at least about 15,000,000 psi, the disclosure of a material having a modulus of elasticity in tension of about 28,000,000 psi, and the disclosure of a 316 series stainless steel for the seat stiffener 610, however, should not be considered limiting on the current disclosure.

For purposes of the current disclosure, a modulus of elasticity measuring about X psi (or Y MPa) measures within a range between X plus (or Y plus) an industry-standard upper tolerance for the specified measurement and X minus (or Y minus) an industry-standard lower tolerance for the specified measurement. Because tolerances can vary between different types of materials and between different batches of the same raw material, the tolerance for the modulus of elasticity of a particular material can fall within a range of tolerances. A typical tolerance for a modulus of elasticity of a material forming a component such as the seat stiffener 610 is plus 1,000,000 psi (approximately 7 GPa) and minus 1,000,000 psi.

FIG. 6 is a detail view of the valve seat 510 and the seat stiffener 610 before assembly also disclosing the inner surface 520, the outer surface 530, the first end surface 540, and the second end surface 550 of the valve seat 510 with the substituent sub-elements of each surface. The valve seat 510 defines a sealing end 512 and the mounting end 514. In various embodiments, the inner surface 520 includes a cylindrical portion 521, an angled portion 522, and the sealing portion 523, each of which face at least partially radially inward. In various embodiments, an intersection between adjacent portions of the inner surface 520 or any other surface of the valve seat 510 may form a radiused portion. In various embodiments, the outer surface 530 is cylindrical in shape. In various embodiments, the first end surface 540 includes a first face portion 541, a first cylindrical portion 544, the radially outward-facing surface 542 and the groove 543 defined in the first cylindrical portion 544 (the groove 543 also defined in the radially outward-facing surface 542), a second face portion 545, a second cylindrical portion 546 facing radially inward, and a third face portion 547. In various embodiments, the second end surface 550 includes a first face portion 551, a cylindrical portion 552 facing radially outward, and a second face portion 553. In various embodiments, the first cylindrical portion 544, the second face portion 545, and the second cylindrical portion 546 define a channel in the first end surface 540 of the valve seat 510 that is sized to receive an annular flange in the retention ring 710 (shown in FIG. 4) defining the first radially inward-facing portion 754, the third face portion 755, and the second radially outward-facing portion 756.

FIG. 7 shows the seat stiffener 610 assembled to the valve seat 510 to form the valve seat device 500. In various embodiments, the seat stiffener 610 included in the valve seat device 500 is positioned on the radially outward-facing surface 542 of the valve seat 510. In various embodiments, the radially outward-facing surface 542 of the valve seat 510 defines the groove 543 sized to receive the seat stiffener 610. In various embodiments, the value of the outer diameter D1 may increase from the first face portion 541 to the second face portion 545 along a radially outermost portion of the radially outward-facing surface 542 with the exception of the groove 543, at which point the radius will become smaller. In other words, the radially outward-facing surface 542 may be inclined or sloped or angled with respect to the horizontal axis 160 when the valve seat 510 is aligned concentrically thereabout.

In various embodiments, the seat stiffener 610 maintains the shape of the valve seat 510 during operation of the valve 100. In various embodiments, the seat stiffener 610 prevents stretching of the valve seat 510 in a radially outward direction but allows various localized portions of the valve seat 510 to either compress or flex as the valve disc 410 engages the valve seat 510 during opening and closing of the valve 100. In various embodiments in which the seat stiffener 610 is narrow in an axial direction relative to both the inner surface 520 and the radially outward-facing surface 542, the overall size and position of the valve seat 510 is maintained without constraining the localized movement of localized portions of the valve seat 510. In various embodiments, a cross-sectional diameter D5 of the seat stiffener 610 is less than about 10% of an overall axial height of the valve seat 510 although the disclosure of such a value for the diameter D5 should not be considered limiting on the current disclosure. In various embodiments in which the seat stiffener 610 has a circular cross-section, the valve seat 610 is able to rock or rotate ever so slightly while still being able to spring back to its original shape. In various embodiments, the relatively high modulus of elasticity and fatigue resistance of the material or materials forming the seat stiffener 610 allows the seat stiffener 610 to withstand repeated loading at levels that a valve seat without a seat stiffener 610 could not withstand. In various embodiments, the use of certain materials such as steel for the seat stiffener 610 will allow the valve 100 to go through an indefinite number of loading cycles without experiencing fatigue failure as long as the stress experienced by the material of the seat stiffener 610 during operation is below a fatigue limit of the material.

In various embodiments, the groove 543 defined in the radially outward-facing surface 542 prevents axial movement of the seat stiffener 610 relative to the valve seat 510. In various embodiments in which the radially outward-facing surface 542 is inclined or sloped or angled with respect to the horizontal axis 160, the existence of groove 543 allows the seat stiffener 610 to be positioned in the same exact location even after disassembly and reassembly of the valve 100 and therefore allows the seat stiffener 610 to support the valve seat 510 in the same way after servicing as before and without dependence on careful measuring or alignment of parts. In various embodiments in which the depth of the groove 543 is equal to or greater than a cross-sectional radius of the seat stiffener 610 and a minimum diameter of the groove is about equal to the inner diameter D3 of the seat stiffener 610, the seat stiffener 610 is only dislocated or removed by intentional disassembly. In various embodiments, the forces acting on the valve seat 510 are too low and the depth of the groove 543 to high to permit any accidental dislocation of the seat stiffener 610 during operation of the valve 100.

In various embodiments, a method of manufacturing a valve seat device 500 includes aligning the valve seat 510 and the seat stiffener 610 along a common axial direction and sliding the seat stiffener 610 over the valve seat 510 so that the seat stiffener 610 is positioned on the radially outward-facing surface 542 of the valve seat 510. In various embodiments, the step of sliding the seat stiffener 610 over the valve seat 510 includes applying inward radial pressure to the valve seat 510. In various embodiments, the step of sliding the seat stiffener 610 over the valve seat 510 includes maintaining the inner diameter D3 of the seat stiffener 610 and compressing portions of the valve seat 510 in a radial direction. In various embodiments, the method includes inserting a seat stiffener 610 in a groove 543 of the valve seat 510. In various embodiments, the method further includes forming a seat stiffener 610 from wire. In various embodiments, the method further includes forming a valve seat 510, wherein the radially outward-facing surface 542 defines the groove 543 and wherein the groove 543 is sized to receive the seat stiffener 610.

In various embodiments, a method of sealing a valve 100 includes closing the valve 100 and preventing radial expansion of the valve seat 510 with a seat stiffener 610, the seat stiffener 610 formed from a non-elastomeric material and positioned on a radially outward-facing surface 542 of the valve seat 510, an outer diameter D1 of the radially outward-facing surface 542 of the valve seat 510 being greater than an inner diameter D3 of the seat stiffener 610.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve seat device for a valve, the device comprising:
a valve seat defining a groove in a radially outward-facing surface of the valve seat, a semicircular bottom portion defined in the groove, portions of the radially outward-facing surface defined in the valve seat at opposite axial ends of the groove, the radially outward-facing surface angled with respect to a horizontal axis of the valve when the valve seat is aligned concentrically about the horizontal axis and in an undeformed condition; and
a ring-shaped seat stiffener, the seat stiffener
formed from a non-elastomeric material;
comprising a solid cross-section, the cross-section taken along an axial centerline of the valve seat device;
positioned on the radially outward-facing surface of the valve seat, an outer diameter of the radially outward-facing surface of the valve seat being greater than an inner diameter of the seat stiffener; and
positioned radially inward from a radially inward-facing surface of the valve seat;
locked in an axial direction in the groove of the valve seat, a width of the groove in an axial direction and a radial depth of the groove in a radial direction relative to the horizontal axis of the valve substantially equal to the diameter of the seat stiffener, wherein the radially outward-facing surface is angled with respect to the horizontal axis of the valve to facilitate assembly of the seat stiffener on and removal of the seat stiffener from the valve seat;
removable from the valve seat; and
configured to prevent radial expansion of the valve seat.

2. The device of claim 1, further comprising a valve body and a retention ring configured to hold the valve seat in place against a seat mating surface of the valve body, the seat stiffener separated from the retention ring when the valve seat is in the undeformed condition.

3. The device of claim 1, wherein the seat stiffener is welded into an annular ring from a single length of wire.

4. The device of claim 1, wherein a thickness of the seat stiffener in an axial direction parallel to the horizontal axis is less than about 25% of an overall axial height of the valve seat.

5. The device of claim 1, wherein the seat stiffener is formed from steel.

6. The device of claim 1, wherein the seat stiffener is formed from a material having a modulus of elasticity of at least about 15,000,000 psi.

7. The device of claim 6, wherein the seat stiffener is formed from a material having a modulus of elasticity of about 28,000,000 psi.

8. The device of claim 1, wherein the valve seat is formed from polytetrafluoroethylene (PTFE).

9. The device of claim 1, further comprising a retention ring, wherein an inner diameter of a radially inward-facing surface of the retention ring that is adjacent to and facing the seat stiffener is greater than an outer diameter of the radially outward-facing surface of the valve seat.

10. The device of claim 1, wherein the seat stiffener comprises a circular cross-section, the cross-section taken along an axial centerline of the valve seat device.

11. The device of claim 1, wherein the valve disc of the valve is configured to rotate about the vertical axis.

12. A valve comprising:
a valve body;
a valve disc defining a sealing surface defining a first radius defining a center, the valve disc configured to rotate about a vertical axis of the valve; and
a valve seat device, the valve seat device including
a valve seat defining a sealing end and a mounting end distal from the sealing end; and
a seat stiffener, the seat stiffener
formed from a non-elastomeric wire material;
comprising a solid cross-section, the cross-section taken along an axial centerline of the valve seat device;
positioned on a radially outward-facing surface of the valve seat, an outer diameter of the radially outward-facing surface of the valve seat being greater than an inner diameter of the seat stiffener, the valve seat defining a groove in the radially outward-facing surface of the valve seat, a semicircular bottom portion defined in the groove, portions of the radially outward-facing surface defined in the valve seat at opposite axial ends of the groove; and
positioned radially inward from a radially inward-facing surface of the valve seat.

13. The valve of claim 12, wherein the valve is a butterfly valve.

14. The valve of claim 12, further comprising a retention ring configured to hold the valve seat in place against a seat mating surface of the valve body, wherein an inner diameter of a radially inward-facing surface of the retention ring that is adjacent to and facing the seat stiffener is greater than an outer diameter of the radially outward-facing surface of the valve seat, the seat stiffener separated from the retention ring when the valve seat is in an undeformed condition.

15. The valve of claim 12, wherein the sealing portion of the inner surface of the valve seat and the sealing surface of the valve disc are angled in cross-section with respect to the horizontal axis of the valve by the same angle.

16. A method of sealing a valve, the method comprising:
 closing the valve;
 contacting a sealing portion of an inner surface of a valve seat of the valve with a sealing surface of a valve disc of the valve, the sealing portion of the inner surface of the valve seat and the sealing surface of the valve disc being angled in cross-section with respect to a horizontal axis of the valve by the same angle; and
 preventing radial expansion of the valve seat of the valve with a seat stiffener, the seat stiffener formed from a non-elastomeric wire material comprising a solid cross-section and positioned in a groove defined in a radially outward-facing surface of the valve seat, portions of the radially outward-facing surface defined in the valve seat at opposite axial ends of the groove, an outer diameter of the radially outward-facing surface of the valve seat greater than an inner diameter of the seat stiffener and angled with respect to a horizontal axis of the valve when the valve seat is aligned concentrically about the horizontal axis and in an undeformed condition, a radially inward-facing portion of a retaining ring of the valve defining a channel between the retaining ring and the valve seat.

17. The method of claim 16, wherein preventing radial expansion of the valve seat includes maintaining a diameter of the seat stiffener.

18. The method of claim 16, wherein a width of the groove in an axial direction and a radial depth of the groove in a radial direction relative to the horizontal axis are substantially equal to the diameter of the seat stiffener.

19. The method of claim 16, wherein the seat stiffener is positioned radially inward from a radially inward-facing surface of the valve seat.

20. A method of assembling a valve seat device, the method comprising:
 aligning a seat stiffener of the valve seat device with a valve seat of the valve seat device along a common horizontal axis;
 contacting a radially outward-facing surface of the valve seat with the seat stiffener, the radially outward-facing surface of the valve seat angled with respect to the horizontal axis when in an undeformed condition; and
 inserting the seat stiffener into a groove defined in the radially outward-facing surface of the valve seat such that the seat stiffener is fixed in the groove of the valve seat in an axial direction aligned with the horizontal axis, portions of the radially outward-facing surface defined in the valve seat at opposite axial ends of the groove.

21. The method of claim 20, wherein a width of the groove in an axial direction and a radial depth of the groove in a radial direction relative to the horizontal axis are substantially equal to a diameter of the seat stiffener.

22. The method of claim 20, further comprising locking the seat stiffener in the groove of the valve seat in an axial direction of the valve seat.

23. The method of claim 20, further comprising removing the seat stiffener from the valve seat.

\* \* \* \* \*